United States Patent [19]

Dräbing et al.

[11] Patent Number: 5,032,342
[45] Date of Patent: Jul. 16, 1991

[54] PROCESS FOR PRODUCING A SUSPENSION EYE FOR EXHAUST SYSTEM OF A MOTOR VEHICLE

[76] Inventors: Walter Dräbing, Am Schnepfenbusch 10, 3501 Niestetal; Kurt Fiedler, Raiffeisenstr. 1, Zierenberg, both of Fed. Rep. of Germany

[21] Appl. No.: 425,068

[22] Filed: Oct. 23, 1989

Related U.S. Application Data

[62] Division of Ser. No. 267,808, Nov. 7, 1988, Pat. No. 4,893,778.

[30] Foreign Application Priority Data

Nov. 9, 1987 [DE] Fed. Rep. of Germany ....... 3737987

[51] Int. Cl.⁵ .............................................. B29C 45/14
[52] U.S. Cl. ..................................... 264/263; 264/277
[58] Field of Search ............................ 264/263, 277; 425/129.1, 123

[56] References Cited

U.S. PATENT DOCUMENTS

| | | | |
|---|---|---|---|
| 2,425,831 | 8/1947 | Rozanek | 425/123 |
| 3,979,110 | 9/1976 | Newton | 267/152 |
| 4,415,391 | 11/1983 | Reid | 267/153 |

Primary Examiner—Jan H. Silbaugh
Assistant Examiner—Merrick Dixon
Attorney, Agent, or Firm—Thomas, Kerr & Kayden

[57] ABSTRACT

A suspension eye (1), having two suspension points, for an exhaust system of a motor vehicle has a band (2) of elastomer material and a self-contained liner (3) which is elastically deformable in the plane of the band and has an at least rhombus-like initial shape. The liner (3) consists of extensible, resiliently compliant material. Embedded in the band (2) are two bushes (4, 5) and the liner (3) in the band (2) bears directly against the bushes (4, 5).

2 Claims, 1 Drawing Sheet

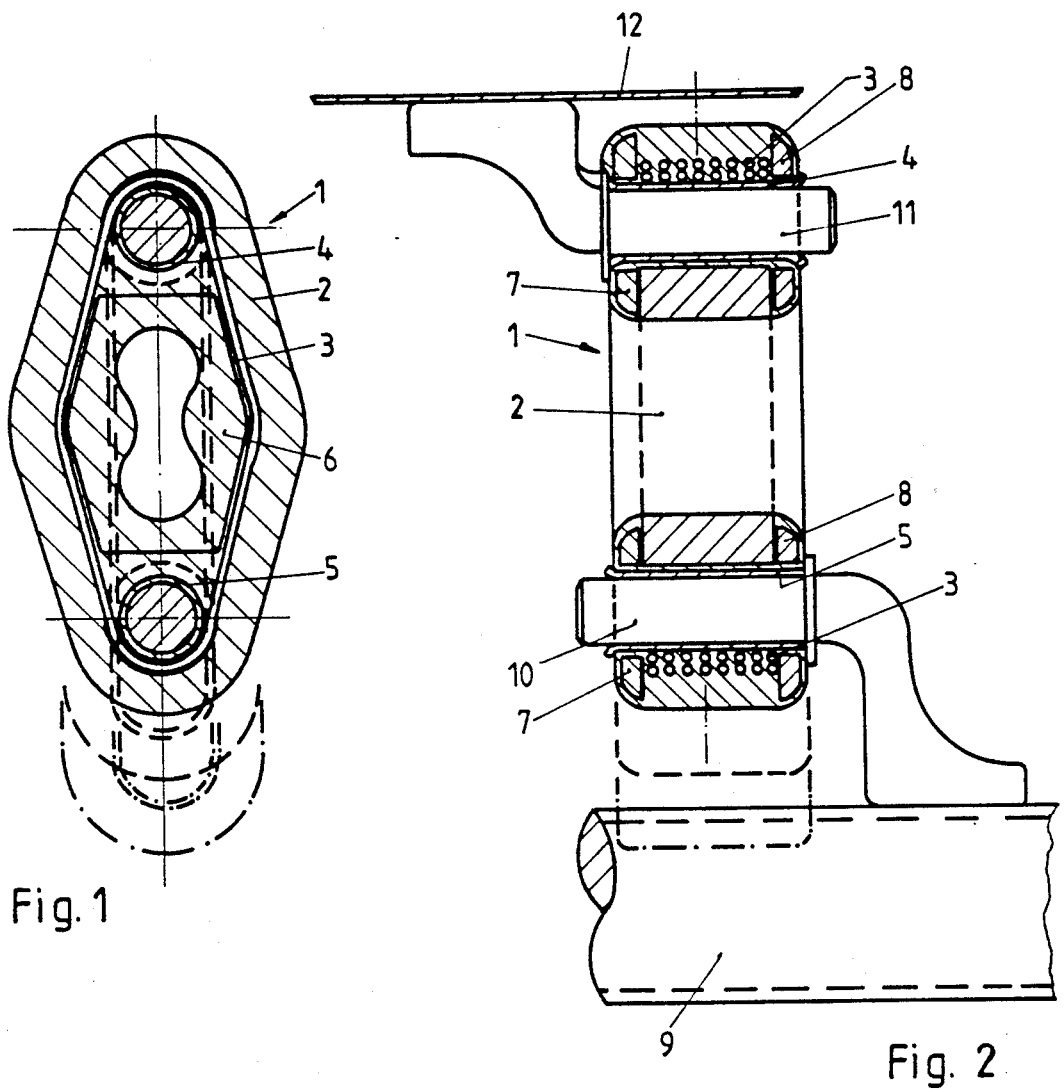
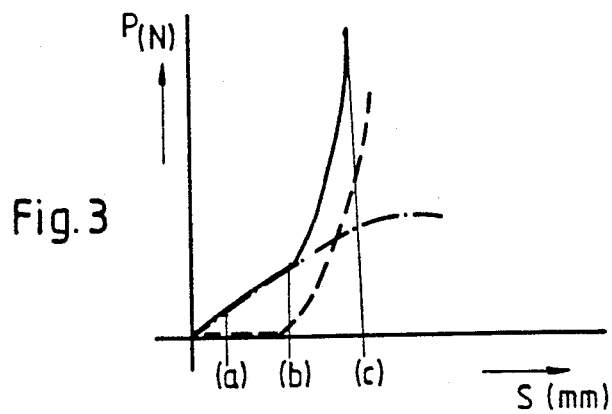

PROCESS FOR PRODUCING A SUSPENSION EYE FOR EXHAUST SYSTEM OF A MOTOR VEHICLE

CROSS REFERENCE TO RELATED APPLICATION

This is a division of patent application Ser. No. 267,808, filed Nov. 7, 1988, now U.S. Pat. No. 4,893,778.

FIELD OF THE INVENTION

The invention relates to a suspension eye having two suspension points, for an exhaust system of a motor vehicle, with a band of elastomer material and a self-contained liner which is elastically deformable in the plane of the band and has an at least rhombus-like initial shape. Such suspension eyes are used, usually in plurality, between the floor of a motor vehicle and an exhaust system. They serve to insulate the two interconnected bodies against structure-borne sound and to suspend the exhaust system in a limitedly resiliently compliant manner.

A suspension eye of the type described at the beginning is known from German Auslegeschrift 2,658,358. This has a band of rubber-like material, which is passed through in its central region by crosspieces. The outer region of the band has an approximately annular rhombus-like form. Moreover, the band has two arcuately running slits, which form two suspension points and on which on the one hand a hook is hung which is fastened to the floor of the motor vehicle and on the other hand a further hook is hung which is fastened to the exhaust system. Embedded approximately in the center of the cross-section of the outer annular part of the band is a self-contained liner, which is elastically deformable in the plane of the band and tension-resistant and may consist of a steel wire or a spring steel strip. This liner likewise has a rhombus-like initial shape. When stressed, the band deforms together with the liner, the permissible spring excursion being limited by a stretched position of the tension-resistant liner in the sense of a stop. Consequently, a progressive characteristic of the band during deflection is aimed for. Both the band of elastomer material and the liner assume forces over the entire permissible range of movement with corresponding deflection of the exhaust system, and therefore act together from the outset. Consequently, it is indeed possible to achieve a certain progressivity. However, it is disadvantageous that, due to the tension-resistant design of the liner, that is the use of a to this extent rigid steel wire in a stretched form, a very abruptly occurring stop is formed, which limits any further rebound. In addition, the liner is arranged approximately in the center of the annular region of the band and consequently at a corresponding distance from the slit-shaped suspension points, the intermediate space being filled with elastomer material. These regions of the band are subjected to considerable compressive loading in the stretched position of the liner, because the liner is of tension-resistant design. Consequently, there is the risk of excessively stressing the elastomer material in these regions. When compressed, the liner is substantially free, apart from bending forces, and the corresponding forces are absorbed by crosspieces on the band. The crosspieces may conversely also form a stop with one another, in order to limit the compressing movement. The tension-resistantly designed liner, which may also consist of a steel rope, is thus itself not extensible and does not consist of resiliently compliant material. With its bending deformability, from the outset it in fact only reinforces the band of elastomer material and, moreover, represents an abruptly occurring stop at the end of the rebound movement of the band.

BACKGROUND OF THE INVENTION

Summary of the Invention

The invention is based on the object of further developing a suspension eye of the type described at the beginning in such a way that, with small rebound movements, a relatively soft suspension is achieved with good vibration insulating effect, while in the range of larger deflections a greater progressivity of the characteristic is attained, that is the springing becomes considerably harder, until ultimately the maximum spring excursion is reached.

This is achieved according to the invention by the liner consisting of extensible, resiliently compliant material, two bushes being embedded in the band, and the liner arranged in the band bearing directly against the bushes. What is essential is that the liner no longer consists of tension-resistant material which is elastically deformable merely in the plane of the band, but that extensible, resiliently compliant, that is inherently elastic material is also used for the liner. This other material allows that the liner is not, as previously, subjected to bending stress - apart from its stop function - but that, with small rebounds, the liner also remains free from appreciable bending forces, so that, in the range of these small deflections, the properties of the band of elastomer material alone come into use. This springing is consequently particularly soft in this initial range and thus sound-insulating and vibration-insulating. Although the liner is provided alongside the band from the outset, its action in terms of force does not commence virtually until the transition range between small and large rebounds, i.e. the liner creates a free space in terms of force for small rebound movements, in which it does not or virtually does not come into effect. Instead, its action in terms of force commences at the transition point to large rebounds, so that the spring characteristic receives in this range as it were a transition kink, from whence a significantly increased progressivity is produced. It is important to appreciate that, at this instant of transition, the spring excursion is not already limited by a mechanically acting stop but that now, upon extension of the liner, in fact for the first time the progressive part of the spring characteristic occurs. In this range, the springing is thus very hard and, with ever increasing rebounds, opposes considerable restoring forces. During this, the liner is lengthened and extended out of the stretched position. The material of the liner thus itself has an appreciable spring excursion and also has a considerable recovery, so that no solid stop is formed in this range. A solid stop is, at it were, dispensed with in the case of the new suspension eye, which is possible due to the strong progressivity. The band and the liner are in this case designed and dimensioned such that the maximum operating load between the suspension points, and consequently the permissible tensile stress in the material, are not exceeded. Also important is the arrangement of the bushes in the band, to be precise in two respects. Firstly, these bushes form stress-appropriate receiving points for receiving pin-shaped hooks on the floor of the motor vehicle on the one hand and on the exhaust system on the other hand, to be precise without there being the risk that the band of elastic material is torn or otherwise damaged by the attachment of these pin-shaped hooks. Secondly, these bushes serve as direct application of force for the liner in the range of relatively large rebounds. Regions of elastomer material which could thereby be subjected to excessive compressive stresses are avoided.

The liner may consist of an, in particular, multi-layered loop of yarn, that is of a yarn which is looped several times around the suspension points on the bushes. This has the effect, as it were, of forming a yarn loop assembly, which can be made on the one hand sufficiently compliantly elastic and on the other hand correspondingly reinforcing.

The band and the liner may have spring excursions of a similar order of magnitude. Consequently, a clear delimitation from a tension-resistant liner is achieved, which has virtually no appreciable spring excursion. Due to the fact that the spring excursions are approximately of the same order of magnitude, the spring characteristic receives two regions which are distinctly and tendentially separate from each other and joined by a transition region. In the lower region, the characteristic has a small slope and in the upper region it has a large slope.

The loop of yarn may consist of a resiliently compliantly made yarn of natural materials such as cotton, silk or the like and/or of plastic. All that is important is that the yarn must be finished such that it itself becomes resiliently compliant.

The suspension eye is expediently designed as an injection molding and has inserted crude elastomer workpieces surrounded by injection molding material. These crude elastomer pieces serve to fix the rhombus-like initial shape of the liner in the unloaded position.

A process for producing a suspension eye having two suspension points uses an injection mold and is defined according to the invention by two bushes being introduced in stable position into the injection mold, the liner being placed over the bushes and spread out into the rhombus-like initial shape by at least one crude elastomer piece likewise to be inserted into the injection mold, and elastomer material being injected round the inserted parts. Although the material of the liner is in itself not very dimensionally stable, the rhombus-like initial shape is secured and achieved by the liner being spread out or set out correspondingly between the bushes and an inserted crude elastomer piece before the injection of the remaining elastomer material into the injection mold takes place. It goes without saying that a vulcanization in the mold subsequently follows, if, for example, rubber is used as elastomer material.

In addition, side cover parts of crude elastomer material may be inserted into the injection mold in order that, when it is introduced into the injection mold, the liner is not spread out only in the direction of the plane of the suspension eye but is also held and mounted in the direction perpendicular thereto. The liner is consequently given is symmetrical seating within the band.

BRIEF DESCRIPTION OF THE DRAWINGS

The invention is further illustrated and described with reference to a preferred embodiment. In the drawing:

FIG. 1 shows a front view of the suspension eye, FIG. 2 shows a side view of the suspension eye according to FIG. 1, partially in section, and FIG. 3 shows a characteristic diagram of this suspension eye.

DETAILED DESCRIPTION

In FIGS. 1 and 2, a suspension eye 1 is shown, which has as essential components a band 2 of elastomer material, in particular rubber, in which a liner 3 of extensible, resiliently compliant material is arranged. The liner 3 has an at least rhombus-like initial shape and is looped over two bushes 4 and 5, which are arranged or embedded in the band 2. The band 2 may consist of a plurality of parts and consequently have a crude elastomer piece 6 as well as side cover parts 7 and 8. The crude elastomer piece 6 serves the purpose of fixing the liner 3 during its production in the spread-out, rhombus-like initial position while the remaining elastomer material, which forms the band 2, is injected into an injection mold. The two side cover parts 7 and 8 serve the purpose of positioning the liner 3 symmetrically with respect to the central loop plane (FIG. 2) in the band 2. The production of the suspension eye 1 in an injection mold is possible in a simple way by firstly a side cover part 7 being inserted into this injection mold. Subsequently, the bushes 4 and 5 are fitted on in stable position, for example on pins fitted in the mold. Furthermore, the liner 3 is hung over the bushes 4 and 5 and spread out by insertion of the crude elastomer piece 6. Finally, the side cover part 8 is put in place and the injection mold is closed. The injection of the elastomer material then takes place. Rubber, in particular, or plastic may be used as elastomer material. In the case of rubber, a vulcanization, and consequently a joining of the individual parts, takes place in the injection mold.

The drawings of FIGS. 1 and 2 show the static state and the shaping thereby assumed of the suspension eye 1 if an exhaust system, for example a pipe 9, is inserted with the aid of a pin-shaped suspension hook 10 in the suspension eye 1, which for its part is hung onto a further pin-shaped suspension hook 11, which engages in the bush 4 and is permanently fastened to the floor 12 of a motor vehicle. The suspension eye 1 is in this case already drawn or deformed somewhat in length in comparison with its unloaded production form, as represented by solid lines in FIGS. 1 and 2. This position corresponds to position a in the characteristic diagram of FIG. 3. In the range of small rebounds downward in the region of the pipe 9, the band 2 of the suspension eye 1 deforms, although this also involves the shape of the liner 3 changing. The liner 3, however, does not have any appreciable bending resistance, so that the characteristic is determined alone by the restoring forces in the band 2, until the stretched position of the liner is reached, which is shown in dashed lines. This position b is drawn-in in the characteristic diagram of FIG. 3. In the range of larger rebounds, finally the end position c is reached, which is indicated by dot-dashed lines in FIGS. 1 and 2.

The characteristic diagram according to FIG. 3 shows the spring force over the spring excursion. The dot-dashed line represents the spring characteristic of the band 2 alone. The dashed line represents the spring characteristic of the liner 3 alone. The solid line shows the addition of these two characteristics, that is the characteristic of the complete suspension eye 1. It is evident that the liner 3 does not cause any share of the action in the region of small rebounds between the positions a and b but, on the contrary, ensures that here the band 2 alone comes into effective use. On the other hand, however, from the transition region of position b up to the maximum limitation of the rebound according to position c, the very steep characteristic of the liner 3 acts, with the effect that a characteristic with a substantially more progressive path than in the prior art is achieved. The liner 3 consists of an extensible, resiliently compliant material, is thus itself inherently elastic and covers appreciable spring excursions under the effect of tensile forces. It is evident from FIG. 3 that the spring excursion of the liner 3 is of approximately the order of magnitude of the previously traveled spring excursion of the band 2, or in other words the complete spring excursion of the band 2 is in a ratio to the spring excursion of the liner of about 2:1. The spring excursions of the band 2 and of the liner 3 are of comparable orders of magnitude, i.e. the liner 3 is not of tension-resistant design, but elastic.

We claim:

1. A process of producing a suspension eye for an exhaust system of a motor vehicle comprising:
    placing two bushes in a stable position within an injection mold with the axes of the bushes parallel and with the bushes spaced apart in the same plane;
    placing a continuous liner about the bushes within the injection mold;
    placing at least one crude elastomer piece within the injection mold within the confines of the liner and generally between the bushes with the crude elastomer piece being of larger breadth than the bushes so as to urge the lengths of the liner spanning the space between the bushes outwardly and to form the liner in a rhombus-like shape with rounded corners;
    closing the mold, and
    injecting elastomer material into the mold about the parts placed in the mold.

2. A process of producing a suspension eye for an exhaust system of a motor vehicle comprising:
    placing a continuous liner and two bushes in a stable position within a injection mold with the axes of the bushes parallel and with the bushes spaced apart in the same plane, and with the liner surrounding the bushes within the injection mold;
    placing at least one crude elastomer piece within the injection mold within the confines of the liner and generally between the bushes with the crude elastomer piece positioned to urge the lengths of the liner spanning the space between the bushes outwardly and to form the liner in a rhombus-like shape with rounded corners;
    closing the mold, and
    injecting elastomer material into the mold about the parts placed in the mold.

* * * * *